United States Patent [19]

Tynan, Jr. et al.

[11] Patent Number: 5,798,175
[45] Date of Patent: Aug. 25, 1998

[54] PRESSURE SENSITIVE ADHESIVES AND TAPE PRODUCT PREPARED THEREFROM

[75] Inventors: John K. Tynan, Jr., Port Huron, Mich.; Deborah Anne Chrzanowski, Corunna, Canada

[73] Assignee: American Tape Company, Marysville, Mich.

[21] Appl. No.: 792,896

[22] Filed: Jan. 31, 1997

[51] Int. Cl.$^6$ ............................................. C09J 7/02
[52] U.S. Cl. ............................ 428/355 EN; 428/355 BL; 428/356; 524/526; 524/571; 524/575.5
[58] Field of Search ............................ 428/356, 355 BL, 428/355 EN; 524/526, 575.5, 571

[56] References Cited

U.S. PATENT DOCUMENTS

| | | | |
|---|---|---|---|
| 2,532,011 | 11/1950 | Dahlquist | 154/53.5 |
| 2,607,711 | 8/1952 | Hendricks | 117/122 |
| 2,790,732 | 4/1957 | McGarry | 117/122 |
| 2,881,096 | 4/1959 | Kisbany | 117/122 |
| 3,850,786 | 11/1974 | Jeffries et al. | 161/164 |
| 4,105,718 | 8/1978 | Weemes | 260/889 |
| 4,250,273 | 2/1981 | Bohm . | |
| 4,357,459 | 11/1982 | Runavot et al. | 528/205 |
| 4,994,508 | 2/1991 | Shiraki . | |
| 5,591,498 | 1/1997 | Arakawa | 428/40.1 |

OTHER PUBLICATIONS

"Goodyear Chemicals Natsyn Polyisoprene Rubber" product data sheet.

*Primary Examiner*—Jenna Davis
*Attorney, Agent, or Firm*—Thompson Hine & Flory LLP

[57] ABSTRACT

A pressure sensitive adhesive composition comprising a natural or synthetic rubber and a thermoplastic polyolefin blend comprising ethylene-propylene rubber, hydrogenated polyisoprene and polypropylene.

31 Claims, No Drawings

PRESSURE SENSITIVE ADHESIVES AND TAPE PRODUCT PREPARED THEREFROM

BACKGROUND OF THE INVENTION

The present invention is directed to a pressure sensitive adhesive (PSA) composition and, more particularly, to a natural rubber PSA composition that is useful in providing PSA tape in which out-of-roll resistance can be reduced without adversely affecting adhesion-to-backing resistance (i.e., shingling). In tapes, the pressure sensitive adhesive coated backing is wound onto itself to form a roll where the adhesive coated backing is in direct contact with the release coated surface of the continuous backing layer.

For years, self-wound PSA tapes have employed release or backsize surface coatings which provide a low-adhesion surface from which the PSA layer can be more easily separated from the backing substrate upon dispensing of the PSA tape from the roll (U.S. Pat. Nos. 2,532,011 and 2,607,711). Many improvements in these backsize coatings have been made over the years to improve their performance and the consistency of their performance over time. Other approaches have focused on adding so-called deactivators to the PSA which, in conjunction with the backsize coating serve to further reduce out-of-roll resistance. See, for example, U.S. Pat. No. 2,790,732. However, prior approaches to reducing out-of-roll resistance have not been entirely satisfactory because out-of-roll resistance and adhesion-to-backing are generally coupled. A modification which reduces one generally reduces the other.

The primary disadvantages of the current state-of-the-art backsize coatings are that (1) their out-of-roll resistance and adhesion-to-backing, or shingling, properties are coupled, (2) their out-of-roll resistance advances to an unacceptably high level after exposure to ambient and forced aging conditions, (3) they tend to lower adhesion, tack and shear properties of pressure-sensitive adhesives upon exposure to ambient or forced aging conditions, and (4) they tend to be very expensive.

SUMMARY OF THE INVENTION

The present invention provides a PSA composition for which out-of-roll resistance and adhesion-to-backing are not coupled or at least not as directly coupled as they are for conventional PSA compositions. This is achieved while maintaining or increasing other performance properties associated with peel adhesion, tack and shear (e.g., panel adhesion, quick stick to steel and the like) while reducing the direct material cost of the product. In addition, a resistance to increases in the out-of-roll property is achieved during exposure to ambient and forced aging conditions. The PSA composition of the present invention is a natural rubber PSA composition in which a portion (e.g., about 5 to 50%) of the natural rubber is substituted with a thermoplastic blend of polyolefins, namely, ethylene-propylene(EPR)/hydrogenated polyisoprene(HI)/polypropylene(PP). Hereafter, this blend will be referred to as "the thermoplastic blend." Due to the high degree of saturation in these materials, the blend imparts excellent heat, ultraviolet (UV) and oxidative stability to the PSA. Due to its relatively low molecular weight of the constituents making up the blend (3,000 to 10,000), it is compatible with a wide range of elastomers, tackifiers, plasticizers, activators, extenders and the like.

The identification of a PSA composition for which out-of-roll resistance and adhesion-to-backing are essentially uncoupled is very advantageous because out-of-roll resistance can be reduced without sacrificing adhesion-to-backing or shingling properties to the extent they would otherwise be sacrificed using a conventional PSA composition.

This invention provides a means by which the out-of-roll resistance of a PSA tape can be reduced, compared to commercially available backsize coatings, reduced out-of-roll resistance can be maintained over time, the adhesive performance properties associated with adhesion, tack and shear can be maintained or improved, and the direct material cost of the resultant PSA tape product can be reduced.

Examples of the types of pressure sensitive products obtainable with this adhesive invention include, but are not limited to paper tape, kraft tape, cellophane tape, film tape, BOPP (biaxially oriented polypropylene), MOPP (machine oriented polypropylene), and other tape adhesives. The pressure sensitive adhesive composition of this invention may also be utilized as an adhesive without the aid of a backing.

DETAILED DESCRIPTION OF THE INVENTION

In addition to containing natural rubber and the thermoplastic blend, the adhesive compositions of the present invention contain tackifying resins and may contain antioxidants, plasticizers, oils, pigments, extenders, activators, and curing agents. These materials can be selected from among those that are conventionally used in pressure sensitive adhesives and, more particularly, natural rubber based adhesives. The additives can be used in conventional amounts.

Generally two stages are involved in making a finished adhesive. The first stage involves preparing the dry stock and the second stage involves preparing the wet mix.

To prepare the dry stock, the first step is to masticate the raw rubber. An example of raw rubber is natural rubber (high molecular weight cis 1,4-polyisoprene). SIR 10, standard Indonesian rubber. A further example is synthetic cis 1,4-polyisoprene, Natsyn 2200 from Goodyear Tire and Rubber Company. However, the applicants currently have no reason to believe that the desired decoupling of out-of-roll resistance and adhesion-to-backing cannot be achieved using any of the natural rubber and synthetic equivalents thereof conventionally used in natural rubber adhesives.

The dry stock is prepared by mixing, in a Banbury internal mixer at approximately 230° F., the masticated natural rubber, activator, extender, and the EPR,HI and PP blend. A conventional activator and/or extender can be used herein in the amounts in which they are conventionally used in the art. A representative example of an inorganic activator is ZnO from the Midwest Zinc Corporation. An extender example is Wilklay RP, a finely pulverized Kaolin clay from A. E. Flemming.

The EPR preferably has a Mooney Viscosity in the range of 26 to 54 and contains about 40 to 75% ethylene. An example of an EPR useful in the invention is Vistalon 457 from Exxon Chemical Company of Texas.

The HI typically is over 90% hydrogenated and has a low molecular weight (e.g., less than 50,000). An example of an HI useful in the invention is LIR-290 from Kuraray Co. of Japan.

The PP preferably has a tensile strength of about 0.3 to 1.5 psi, 10 to 50 dmm hardness and 1,000 to 20,000 cps at 190° C. viscosity. An example of a PP useful in the invention is P1010 from Eastman Kodak of Tennessee.

The blending of the EPR, HI and PP can be blended in a Banbury pre-heated to 230° F. EPR, HI and PP are typically employed in amounts of about 30 to 95% EPR, 3 to 65% HI, and 0.5 to 3 PP based on the weight of the blend. A preferred blend is 285 parts EPR to 95 parts HI to 19 parts PP.

The adhesive will also contain a tackifying resin. Any of those that are commonly used in the art can be used. Representative examples can be selected from a group consisting of polyterpene resins, aromatic hydrocarbon resins, aliphatic hydrocarbon resins, alicyclic hydrocarbon resins, coumarone-indene resins, rosin-type resins and phenol resins.

The composition of the adhesives of the present invention can be summarized as follows:

|           | Embodiment | Preferred Embodiment |
|-----------|------------|----------------------|
| NR        | 25–95 phr* | 55–90                |
| EPR       | 7–40       | 7–40                 |
| HI        | 2–13       | 2–13                 |
| PP        | 0.5–3      | 0.5–3                |
| Tackifier | 80–140     | 100–130              |

*The combination of NR, EPR, HI and PP must equal 100.

The dry stock is prepared by mixing, in a Banbury internal mixer at approximately 230° F., 265 pounds of the masticated natural rubber, 17 pounds of ZnO, 50 pounds of Wilklay, and 65 pounds of the EPR, HI and PP blend. In these amounts, the dry stock ingredients are mixed for 8 minutes in the Banbury. Upon completion of the dry stock, it is removed from the Banbury and sheeted out using a two-roll mill. The Mooney viscosity is then measured to verify predicted performance of the dry stock in the finished adhesive. For the purposes of this example, the dry stock is further milled until a Mooney viscosity of between 35 and 45 is obtained. The Mooney viscosity is measured by allowing the rubber to warm to 212° F. one minute before the rotor is started. After an additional 4 minutes, the viscosity measurement is made.

To prepare the wet mix, the following procedure can be used. Charge 600 pounds dry stock, 5 pounds antioxidant, for example, Wingstay L-butylated reaction product of p-cresol and cyclopentadiene from Goodyear Tire and Rubber Company and 7 pounds crosslinking agent, for example a sulfur donor like Rylex 30 (alkylphenol polysulfide) from Ferro Corporation, to the Baker-Perkins. A Baker-Perkins is an internal mixer with sigma blades for thorough mixing. The mixer has a heated jacket to allow mixing at elevated temperatures. The invention is not limited to the use of the foregoing additives. Others that are conventionally used in natural rubber PSAs could be used. Begin mixing while heating up the Baker-Perkins. When the mixer temperature has started to warm up, 650 pounds of a tackifying resin, for example Sta Tac B or Wingtac Extra, petroleum hydrocarbon, aliphatic C5 resins from Arizona Chemical or Goodyear Tire and Rubber can be added slowly while maintaining efficient mixing.

The tackifying resin is typically used in an amount of about 80 to 140 parts and preferably 100 to 130 parts per 100 parts total NR, EPR, Hi and PP. After the complete addition of the resin, the temperature is increased to slightly above the melt temperature of the resin. The heat is then turned off and while mixing, the batch is allowed to cool slightly, prior to the addition of the solvent. The solvent, for example toluene, an organic solvent which can be purchased from Ashland Chemical Company, is added very slowly to avoid livering (the break up of the mixture which slides off the blades and is not homogeneous). This finished adhesive is monitored for solids (42%) and viscosity. Products having solids in the range of 35 to 50% and viscosity in the range of 10,000 to 25,000 cps are generally desired. Shortly before production coating, a final accelerator, for example a dispersion of ZIX in water (ZIX is zinc isopropylxanthate) from R.T. Vanderbilt Co., Inc. (refer to U.S. Pat. No. 2,881,096) is added with further mixing and is monitored so as to provide the desired cure response in a conventional manner.

Various types of backing can be used to prepare PSA tapes including films, paper and backings reinforced with materials such as glass, PET, nylon, etc. Paper backings are usually saturated. Two main types of saturated backings are crepe and flatback paper. Saturated paper is the result of combining raw paper with saturant. The raw paper is saturated with any one or a combination of many different rubberlike materials to improve the physical properties of the paper. Of backing saturants, water-based latexes are most common which include SBR (styrene-butadiene rubber), ABS (acrylonitrile-butadiene-styrene), NBR (nitrile-butadiene-styrene) and acrylics. Some examples of backings evaluated include a pre-release coated heavy flatback paper, a pre-release coated lower weight paper backing, and a pre-release coated, printable flatback paper backing.

Backsize Coating

For years, self-wound PSA tapes have employed release or backsize surface coatings which provide a low-adhesion surface from which the PSA layer can be more easily separated from the backing substrate upon dispensing the PSA tape from the roll (U.S. Pat. No. 2,532,011 and U.S. Pat. No. 2,607,711). Most pressure-sensitive tapes are self-wound, that is, wound on themselves and therefore the adhesive is in direct contact with the backing material. When the tape is unwound, the adhesive must remain on the side to which it was applied. The unwind force must be low. The release coating applied to the opposite side of the backing ensures this. The release coating's primary function is to control adhesion to the backing and therefore provide dispensibility. Often the intended end use of product will determine both the type and amount of release coat that must be applied. Release coatings may be applied from either a solvent or water solution with the amount applied depending on the type of backing and release level needed. Release coatings can be either printable or non-printable. Typical coatings are silicone release coatings but any coating commonly used in the industry could be used.

The following Examples are intended to illustrate the invention; they are not intended to limit the invention as other applications of the invention will be obvious to those skilled in the art. The term "phr" refers to parts per hundred rubber. The combined amount of elastomer (NR), EPR, HI and PP is always 100.

|  | Examples | | | | | | | | |
|---|---|---|---|---|---|---|---|---|---|
|  | C | 1 | 2 | 3 | 4 | 5 | 6 | 7 | 8 |
| Dry Stock (all amounts phr) | | | | | | | | | |
| Elastomer | 80 | 79 | 79 | 90 | 70 | 79.5 | 57.5 | 55 | 44 |
| Activator | 5 | 5 | 5 | 5 | 5 | 5 | 5 | 5 | 5 |
| Extender | 15 | 15 | 15 | 15 | 15 | 15 | 15 | 15 | 15 |
| EPR | 0 | 15 | 15 | 7.2 | 21.5 | 7 | 40 | 40 | 40 |
| HI | 0 | 5 | 5 | 2.3 | 7.2 | 13 | 2 | 2 | 13 |
| PP | 0 | 1 | 1 | 0.5 | 1.3 | 0.5 | 0.5 | 3 | 3 |
| Wet Adhesive (all amounts phr) | | | | | | | | | |
| Dry Stock | 126 | 120 | 120 | 120 | 120 | 120 | 120 | 120 | 120 |
| Antioxidant | 1 | 1 | 1 | 1 | 1 | 1 | 1 | 1 | 1 |
| Crosslinking Agent | 1.4 | 1.4 | 1.4 | 1.4 | 1.4 | 1.4 | 1.4 | 1.4 | 1.4 |
| C5 Resin | 120 | 120 | 140 | 140 | 140 | 120 | 120 | 120 | 120 |
| Solvent | 336 | 336 | 336 | 336 | 336 | 336 | 336 | 336 | 336 |
| Wet Adhesive | 578 | 578 | 578 | 578 | 578 | 578 | 578 | 578 | 578 |
| Accelerator | 8 | 8 | 8 | 8 | 8 | 8 | 8 | 8 | 8 |

Approximately 60 wet pounds per ream of the adhesive is deposited on the uncoated side of a pre-release coated heavy (69 pound) flatback, SBR saturated, paper backing from Endura using a knife-over-roll configuration onto the moving web. Out-of-roll resistance and adhesion-to-backing will vary with the substrate and the release coating. While the applicants believe that the thermoplastic blend will be effective when used in combination with a wide range of materials, best results seem to be obtained with certain types of backings and release coatings.

The coated web is sent through an oven whose air flows are adjusted and temperatures are ramped to prevent the breach of LEL concentration of solvent. These ovens maintain a maximum temperature of 310° F., where solvent evaporation and adhesive cross-linking takes place. The coated, cured webs are self-wound onto drums. The dried coating weight is measured to be 25 pounds per ream. The coated tape is slit into one inch widths and wound on 3" cores. The finished tape exhibited the following properties. All properties were measured at 72° F. and 50% relative humidity.

This example will provide, for example, self-adhesion to backing values of 55.6 and release values of 15 oz/in. Compared to a control without the addition of the EPR,HI and PP, these values would be 52.4 and 26 oz/in., respectively.

Work has shown that the presence of all three additives, the EPR,HI and PP, are necessary to achieve the desired reduction of HSUW and the maintenance of A/B values.

The data presented show that the addition of the thermoplastic blend produced adhesives with superior properties especially as they relate to HSUW. The data also show that A/B performance and HSUW have been uncoupled. The aging characteristics of the thermoplastic blend modified adhesives are at least equal to the standard adhesive formulations and in some cases superior.

Peel adhesion is the force required to remove a coated flexible sheet material from a test panel measured at a specific angle and rate of removal. Panel adhesion is an indication of product performance in terms of adhering to a surface. This test is based on the PSTC test method: Peel Adhesion of Single Coated Pressure Sensitive Tapes at 180° Angle, PSTC-1. Tack is the property that enables an adhesive to form a bond with the surface of another material upon brief contact under light pressure. Quick stick (QSS) to steel and kraft are measures of tack. The test method employed is based on PSTC-5. Adhesion-to-backing (A/B) is one method of determining adhesive strength of a pressure sensitive adhesive tape to its own backing following applied pressure. Adhesion-to-backing is important in shingling applications. High speed unwind (HSUW) determines the force necessary to remove a layer of tape from the roll at a fixed rate of speed and a constant angle. Unwinding at a high speed, usually 50–150 feet per minute, gives an indication of unwind performance in use. In the examples, all of the measurements are expressed in oz/inch width of coated sheet.

|  | C | 1 | 2 | 3 | 4 | 5 | 6 | 7 | 8 |
|---|---|---|---|---|---|---|---|---|---|
| Aged 24 hours | | | | | | | | | |
| Panel Adhesion | 70 | 75 | 93 | 87 | 90 | 72 | 84 | 83 | 90 |
| QSS | 29 | 30 | 39 | 33 | 38 | 28 | 32 | 30 | 28 |
| A/B | 52 | 56 | 68 | 55 | 59 | 50.2 | 54 | 51 | 52 |
| HSUW | 26 | 15 | 6 | 8 | 3 | 15 | 12 | 8 | 2 |
| 1 Month Aged | | | | | | | | | |
| Panel Adhesion | 67 | 69 | 77 | 77 | 88.3 | 62 | 80 | 85 | 86 |
| QSS | 28 | 30 | 36 | 33 | 34.3 | 24 | 31 | 28 | 26 |
| A/B | 51 | 54 | 61 | 54 | 58.6 | 36 | 48 | 49 | 45 |
| HSUW | 52 | 30 | 16 | 5 | 4 | 25 | 22 | 14 | 5 |

DMA analysis using a Rheometrics Scientic Ares Rheometer with 7.9 mm parallel plates, was performed on the material identified in this patent. A specific thermal program, −100° C. to 180° C. (ramped at 5° C. per minute), was used and the materials' response to these changes was measured. The frequency was held constant at 10 radians/sec during these measurements. The gap between the plates was 2.2 and the normal forces were 160 to 200.

| DMA Characteristic | Embodiment | Preferred Embodiment |
|---|---|---|
| G" Max Temperature; dynes/cm$^2$ | −52 to −39° C.<br>$0.48 \times 10^{+9}$ to $2.1 \times 10^{+9}$ | −52 to −39° C.<br>$0.48 \times 10^{+9}$ to $2.1 \times 10^{+9}$ |
| Tan Delta Max | −15° C. to 25° C.<br>0.96 to 1.85 | −15° C. to 25° C.<br>0.96 to 1.85 |
| 1st G'/G" Cross Temp; dynes/cm$^2$ | −28° C. to 11° C.<br>$3.4 \times 10^{+7}$ to $16.4 \times 10^{+7}$ | −28° C. to 11° C.<br>$3.4 \times 10^{+7}$ to $16.4 \times 10^{+7}$ |

-continued

| DMA Characteristic | Embodiment | Preferred Embodiment |
| --- | --- | --- |
| 2nd G'/G" Cross Temp; dynes/cm$^2$ | $-4°$ C. to 33° C.<br>$1.1 \times 10^{+6}$ to $4.2 \times 10^{+6}$ | $-4°$ C. to 33° C.<br>$1.1 \times 10^{+6}$ to $4.2 \times 10^{+6}$ |
| G' at 23° C. in dynes/cm$^2$ | $1.4 \times 10^{+6}$ to $7.1 \times 10^{+6}$ | $1.4 \times 10^{+6}$ to $7.1 \times 10^{+6}$ |
| G" at 23° C. in dynes/cm$^2$ | $0.4 \times 10^{+6}$ to $7.8 \times 10^{+6}$ | $0.4 \times 10^{+6}$ to $7.8 \times 10^{+6}$ |
| Tan Delta Valley Temp; dynes/cm$^2$ | 32° C. to 70° C.<br>0.22 to 0.42 | 32° C. to 70° C.<br>0.22 to 0.42 |

Performance of adhesives can be accurately defined by dynamic mechanical analysis (DMA). DMA measures several properties including the storage and loss components and the total modulus. It measures the response of a material as it is deformed under a periodic stress. It provides information on the viscoelastic properties of the adhesives. DMA is very useful for characterizing materials whose molecular relaxation transitions dramatically influence the properties. Such is the case of polymeric materials such as pressure sensitive adhesives. Properties which may be calculated include the flexural storage G' and the loss moduli G", tan delta and the shear storage and loss compliances and the dynamic and complex viscosities. A specific thermal program is used and the material's response to these changes is measured. Transitions are distinguished by a sharp drop in the storage modulus or by a maximum in the tan delta curve. Tan delta is the ratio of the loss modulus to the storage modulus and is indicative of the resiliency or toughness of the test material. The temperature at which the maxima occurs in the tan delta response is approximately equal to the glass transition temperature. This is the point where all polymers exhibit a second order transition temperature range at which the polymer changes from a hard, glasslike solid to a rubbery state. This transition is a reflection of the entropy (freedom of motion) characteristics of the polymer. At a certain temperature range, polymer molecules receive sufficient thermal energy to break out of their "frozen" configurations into a state of rapid segmental motion. In this highly agitated state, the physical entanglements between the long-chain molecules have more freedom of motion and thus impart the rubbery or tack semi-solid properties. The height of the peak can sometimes indicate the degree of cure or the degree of crosslinking present in fully cured systems. The lower and broader the peak, then the more completely cured or more densely crosslinked is the polymer. The area from the tan delta peak to the tan delta valley measures the energy to be dissipated to break the adhesive bond. Satas, D., "Handbook of Pressure Sensitive Adhesive Technology." Van Norstrand Reinhold, N.Y., 1989, pp. 585–599, pp.158–163. In the case of the modified adhesives, the area is smaller and therefore less relaxation energy needs to be dissipated before the bond is ruptured and therefore has better, easier release characteristics.

Various modifications and alterations in this invention will become apparent to those skilled in the art without departing from the scope and spirit of this invention, and it should be understood that this invention is not to be unduly limited to the illustrative embodiments set forth herein.

What is claimed is:

1. A pressure sensitive adhesive composition comprising a natural or a synthetic natural rubber, a tackifying resin and a thermoplastic polyolefin blend comprising ethylene-propylene rubber, hydrogenated polyisoprene and polypropylene.

2. The composition of claim 1 wherein said blend is present in an amount of about 5 to 50 parts per 100 parts of said natural or synthetic rubber.

3. The composition of claim 2 wherein said rubber is natural rubber.

4. The composition of claim 1 wherein said composition comprises about 25 to 95 parts natural or synthetic rubber, about 7 to 40 parts ethylene-propylene rubber, about 2 to 13 parts hydrogenated polyisoprene and about 0.5 to 3 parts polypropylene.

5. The composition of claim 1 wherein said blend comprises about 30 to 95% ethylene-propylene rubber, about 3 to 65% hydrogenated polyisoprene and about 0.5 to 30% polypropylene.

6. The composition of claim 5 wherein said composition contains about 80 to 140 parts of a tackifying resin.

7. The composition of claim 1 wherein said composition has a Mooney viscosity of about 30 to 50.

8. The composition of claim 1 wherein said composition further contains one or more additives selected from the group consisting of a crosslinking agents including but not limited to sulfur donors and phenolics, an antioxidant, a plasticizer, oils, pigments, an extender, an activator and a cure accelerator.

9. The composition of claim 5 wherein said tackifying resin is selected from a group consisting of polyterpene resins, aromatic hydrocarbon resins, aliphatic hydrocarbon resins, alicyclic hydrocarbon resins, coumarone-indene resins, rosin-type resins and phenol resins.

10. The composition of claim 5 wherein said hydrogenated polyisoprene is over 90% hydrogenated and has a molecular weight less than 50,000.

11. The composition of claim 10 wherein said polypropylene has a tensile strength of 0.3 to 1.5 psi, 10 to 50 dmm hardness, and a viscosity of 1,000 to 20,000 cps at 190° C.

12. The composition of claim 11 wherein said ethylene-propylene rubber contains 40 to 75% ethylene and has a Mooney viscosity of about 26 to 54.

13. The composition of claim 1 wherein said composition is suitable for cast coating onto a substrate from an organic solvent to provide a pressure sensitive adhesive tape.

14. The composition of claim 12 wherein said composition has a solids content of about 25 to 50% and a viscosity of about 10,000 to 25,000 centipoise.

15. A pressure sensitive adhesive tape comprising a backing having a layer of a pressure sensitive adhesive on a surface thereof, said adhesive comprising natural or synthetic rubber, a thermoplastic polyolefin blend comprising ethylene-propylene rubber, hydrogenated polyisoprene and polypropylene, and a tackifying resin.

16. The tape of claim 15 wherein said composition is present on said backing at a dry coat weight of about 20 to 35 pounds per ream.

17. The tape of claim 15 wherein said backing is plastic film or paper.

18. The tape of claim 15 wherein said backing is paper, kraft paper or cellophane.

19. The tape of claim 15 wherein said blend is present in an a mount of about 5 to 50 parts per 100 parts of said natural or synthetic rubber.

20. The tape of claim 19 wherein said rubber is natural rubber.

21. T he tape of claim 15 wherein said composition comprises about 25 to 95 parts natural or synthetic natural rubber, about 7 to 40 parts ethylene-propylene rubber, about 2 to 13 parts hydrogenated polyisoprene and about 0.5 to 3 parts polypropylene.

22. The tape of claim 15 wherein said blend comprises about 30 to 95% ethylene-propylene rubber, about 3 to 65% hydrogenated polyisoprene and about 0.5 to 30% polypropylene.

23. The tape of claim 22 wherein said composition further contains about 80 to 140 parts of a tackifying resin.

24. The tape of claim 15 wherein said composition has a Mooney viscosity of about 30 to 50.

25. The tape of claim 15 wherein said composition further contains one or more additives selected from the group consisting of a crosslinking agents including but not limited to sulfur donors and phenolics, an antioxidant, a plasticizer, oils, pigments, an extender, an activator and a cure accelerator.

26. The tape of claim 22 wherein said tackifying resin is selected from a group consisting of polyterpene resins, aromatic hydrocarbon resins, aliphatic hydrocarbon resins, alicyclic hydrocarbon resins, coumarone-indene resins, rosin-type resins and phenol resins.

27. The tape of claim 22 wherein said hydrogenated polyisoprene is over 90% hydrogenated and has a molecular weight less than 50,000.

28. The tape of claim 27 wherein said polypropylene has a tensile strength of 0.3 to 1.5 psi, 10 to 50 dmm hardness, and a viscosity of 1,000 to 20,000 cps at 190° C.

29. The tape of claim 28 wherein said ethylene-propylene rubber contains 40 to 75% ethylene and has a Mooney viscosity of about 26 to 54.

30. The tape of claim 15 wherein said composition is suitable for cast coating onto a substrate from an organic solvent to provide a pressure sensitive adhesive tape.

31. The tape of claim 29 wherein said composition has a solids content of about 25 to 50% and a viscosity of about 10,000 to 25,000 centipoise.

* * * * *

UNITED STATES PATENT AND TRADEMARK OFFICE
CERTIFICATE OF CORRECTION

PATENT NO. : 5,798,175
DATED : August 25, 1998
INVENTOR(S) : John K. Tynan, Jr. et al.

It is certified that error appears in the above-indentified patent and that said Letters Patent is hereby corrected as shown below:

Col. 7, claim 1, line 61, after "resin" insert --,--.

Col. 8, claim 19, line 55, replace "a mount" with --amount--.

Col. 8, claim 21, line 59, replace "T he" with --The--.

Signed and Sealed this

First Day of December, 1998

*Attest:*

BRUCE LEHMAN

*Attesting Officer*  *Commissioner of Patents and Trademarks*